US008700004B2

(12) United States Patent
Gorthi et al.

(10) Patent No.: US 8,700,004 B2
(45) Date of Patent: Apr. 15, 2014

(54) PHONE NUMBER ENCAPSULATION USING TOKEN BASED FRAMEWORK

(71) Applicant: International Business Machines Corporation, Armonk, NY (US)

(72) Inventors: Ramakrishna J. Gorthi, Maharashtra (IN); Yoshinobu Ishigaki, Kanagawa-ken (JP); Mukul Pramod Markande, Maharashtra (IN); Sunil Manohar Ranahandola, Bibwewadi (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/907,066

(22) Filed: May 31, 2013

(65) Prior Publication Data

US 2013/0260716 A1    Oct. 3, 2013

Related U.S. Application Data

(63) Continuation of application No. 12/362,052, filed on Jan. 29, 2009, now Pat. No. 8,457,663.

(51) Int. Cl.
*H04W 88/02* (2009.01)
(52) U.S. Cl.
USPC ........................................................ 455/411

(58) Field of Classification Search
USPC ................... 455/411, 466; 380/258; 713/155
See application file for complete search history.

(56) References Cited

U.S. PATENT DOCUMENTS

| 7,043,760 | B2 | 5/2006 | Holtzman et al. |
| 8,457,663 | B2 * | 6/2013 | Ramakrishna et al. ....... 455/466 |
| 2003/0158960 | A1 | 8/2003 | Engberg |
| 2006/0155999 | A1 | 7/2006 | Holtzman et al. |
| 2007/0005969 | A1 | 1/2007 | Fullerton |
| 2007/0293212 | A1 | 12/2007 | Quon et al. |

OTHER PUBLICATIONS

USPTO Non-Final Office Action, U.S. Appl. No. 12/362,052, Oct. 27, 2011, 6 pages.
USPTO Notice of Allowance, U.S. Appl. No. 12/362,052, Jan. 30, 2013, 20 pages.

* cited by examiner

*Primary Examiner* — Diane Mizrahi
(74) *Attorney, Agent, or Firm* — Yee & Associates, P.C.; Jeffrey S. LaBaw (57) ABSTRACT

Embodiments of the invention related to a method for encapsulating phone numbers preferably using a token based framework and routing calls between users using such a token based framework, where the method comprises generating a set of tokens by a service provider for a phone number provided by the service provider, wherein the set of tokens comprise a generic token and a privacy token, the generic token maintained by the service provider and the privacy token distributed to a first user. Other embodiments are also disclosed.

20 Claims, 4 Drawing Sheets

PHONE NUMBER ENCAPSULATION USING TOKEN BASED FRAMEWORK

CROSSS-REFERENCE TO RELATED APPLICATIONS

This application is a continuation of U.S. patent application Ser. No. 12/362,052 filed on Jan. 29, 2009, and now issued as U.S. Pat. No. 8,457,663 and entitled "Phone Number Encapsulation Using Token Based Framework," which is incorporated here by reference.

BACKGROUND OF INVENTION

Cellular telephones ("cell phones") have become a very popular and a convenient means of interacting and networking for various purposes ("interaction"), such as social/personal and business/professional. Persons can exchange their cell phone numbers for such interaction and contact each other generally whenever they want to without any restriction. Such exchange which results in the disclosure of the persons' cell phone number, may then be abused (e.g., called undesirably), misused (e.g., distributed undesirably), etc. with limited to and sometimes no ability to restrict such undesirable actions. Alternately, one or both of the interacting persons may need to change their cell phone number (e.g., after moving to a different region) without having the ability to provide their new cell phone number to the other interacting person to continue such interaction.

BRIEF SUMMARY OF THE INVENTION

According to an embodiment of the invention is disclosed a method for encapsulating phone numbers, the method comprising generating a set of tokens by a service provider for a phone number provided by the service provider, wherein the set of tokens comprise a generic token and a privacy token, the generic token maintained by the service provider and the privacy token distributed to a first user. The privacy token owned by the first user may be assigned to a second user by the first user. The first user on distributing the privacy token to the second user is configured to receive a privacy token from the second user. The generic token associated with the privacy token of the first user and the second user is updated accordingly at the service provider.

According to a further embodiment of the invention is disclosed a method for routing a call between a first user and a second user, the method comprising accessing a privacy token of the first user, on a mobile device of the first user, by the first user; routing a call to a service provider of the first user; determining a privacy token of the second user, wherein information regarding the second user is stored in a generic token of the first user; determining a service provider of the second user using the privacy token of the second user; routing the call to the service provider of the second user; transmitting the privacy tokens of the first user and the second user to the service provider of the second user; and completing the call to the second user through the service provider of the second user.

The generic token of the first user maintained at the service provider is configured to contain at least one of the privacy tokens of the second user. The privacy token of each user as information of the service provider associated with the user. The generic token associated with the first user is configured to store the phone number of the first user. The generic token associated with the second user is configured to store its privacy settings. The privacy settings may consist of the time of the day during which the second user can be called, and the first user can call the second user only if he calls during the time allowed through the privacy settings of the second user. The first user can block the second user from calling by deactivating the privacy token that it had shared with the second user. Deactivating the privacy token comprises at least one of deleting the privacy token or dropping the generic token holding the association between privacy tokens of the first user and the second user. If the first user's telephone number is changed, all the relevant generic tokens can be updated with the new telephone number thereby allowing the second user to call the first user without knowing that the telephone number of the first user has changed.

On routing the call to the second user's service provider, the generic tokens stored with the second user's service provider are scanned. On scanning, the generic token containing the association between the privacy tokens of the first and the second user, the mobile number included in this generic token, and the second users service provider places the call to the second user using the cell phone number are fetched from the generic token.

Additional features and advantages are realized through the techniques employed by embodiments of the invention. Other embodiments and aspects of the invention are described in detail herein and are considered a part of the claimed invention. For a better understanding of the embodiments of the invention with advantages and features, reference should be made to the description and to the drawings.

BRIEF DESCRIPTION OF THE DRAWINGS

The subject matter that is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

The detailed description explains the preferred embodiments of the invention, together with advantages and features, by way of example with reference to the drawings.

DETAILED DESCRIPTION OF INVENTION

According to exemplary embodiments of the invention described herein, phone number encapsulation using a token based framework is provided. In accordance with such exemplary embodiments, a first cell phone user subscribed to a first cell phone service provider can communicate (e.g., make or receive calls) with a second cell phone user subscribed to a second cell phone service provider via their respective cell phones without either user disclosing the phone number of their respective cell phone to the other, thereby providing mutual phone number privacy. Furthermore, either cell phone user can limit the other cell phone user from calling, e.g., during certain times, or prevent the other user from further calling at all (e.g., to discontinue future interaction). Moreover, either cell phone user can change the phone number of their respective cell phone without disclosing the new phone number to the other user or informing the other user of the change and without disrupting the ability of the other user to communicate with the user via their respective cell phones.

Figure 1:
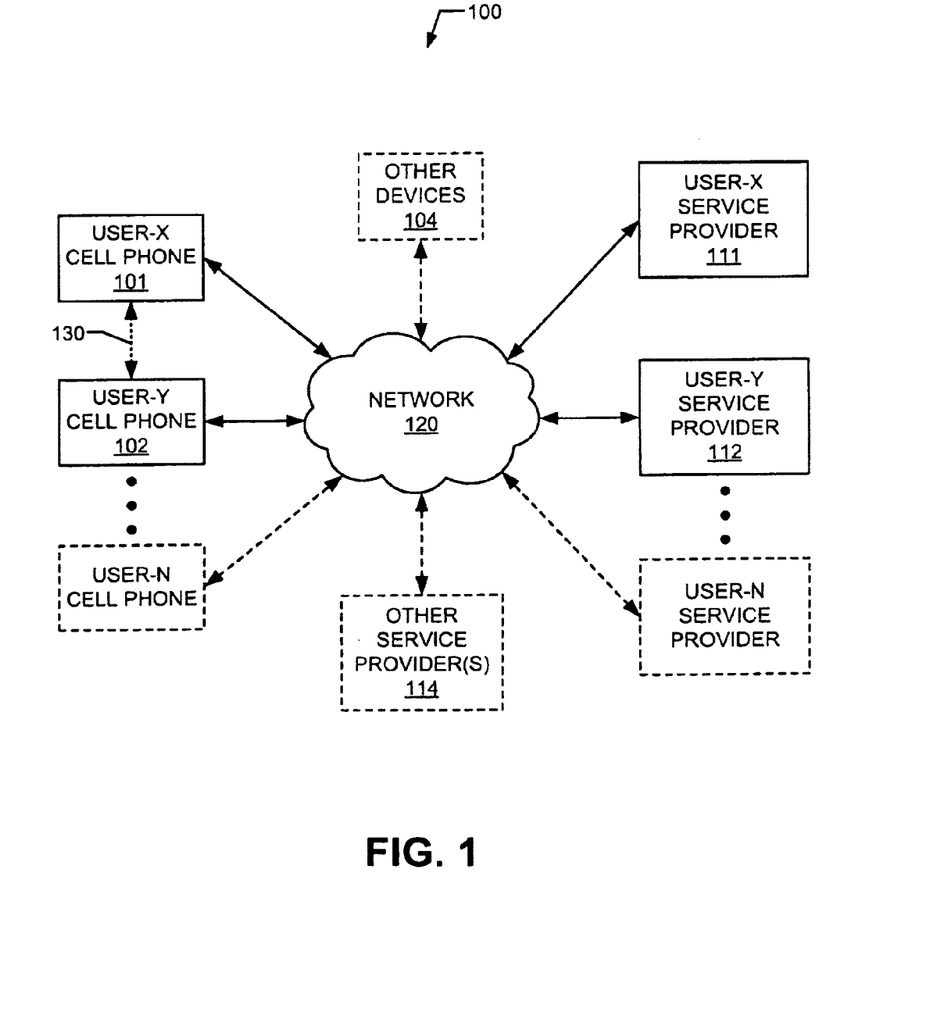
FIG. 1 is a block diagram illustrating an example of a cell phone communications system including exemplary cell phone service providers configured to provide phone number encapsulation using a token based framework.

Turning now to the drawings in greater detail, wherein like reference numerals indicate like elements, FIG. 1 is a block diagram illustrating an example of a cell phone communications system 100 including exemplary cell phone service providers 111, 112 configured to provide phone number encapsulation using a token based framework in accordance with exemplary embodiments of the invention. The exemplary communications system 100 includes two or more user cell phones 101, 102 (e.g., cellular telephones, cell-phones, mobile phones, etc.) in communication via two or more cell phone service providers 111, 112, respectively. For example, a user-x of cell phone 101 may be subscribed to cell phone service provider 111 via which user-x can communicate with a user-y of cell phone 102 via the subscribed cell phone service provider 112 of user-y. Each cell phone service provider 111, 112 may include one or more systems, components, etc. to facilitate such communication. Furthermore, such communication may occur via a network 120, which includes one or more wireless communication mediums and may further include one or more wired communications mediums. Exemplary communication system 100 may include one or more other devices 104 (e.g., other cellular, mobile, wireless, etc. devices) that are subscribed to one or more other service providers 114, which also communicate via network 120. Moreover, the two or more cell phones 101, 102 may communicate via an exchange 130, which may include infrared (IR) signal communication or low power radio frequency (RF) signal communication (e.g., Bluetooth® format). Exchange 130 may include other configurations, such as other wireless or wired configurations.

Figure 2:
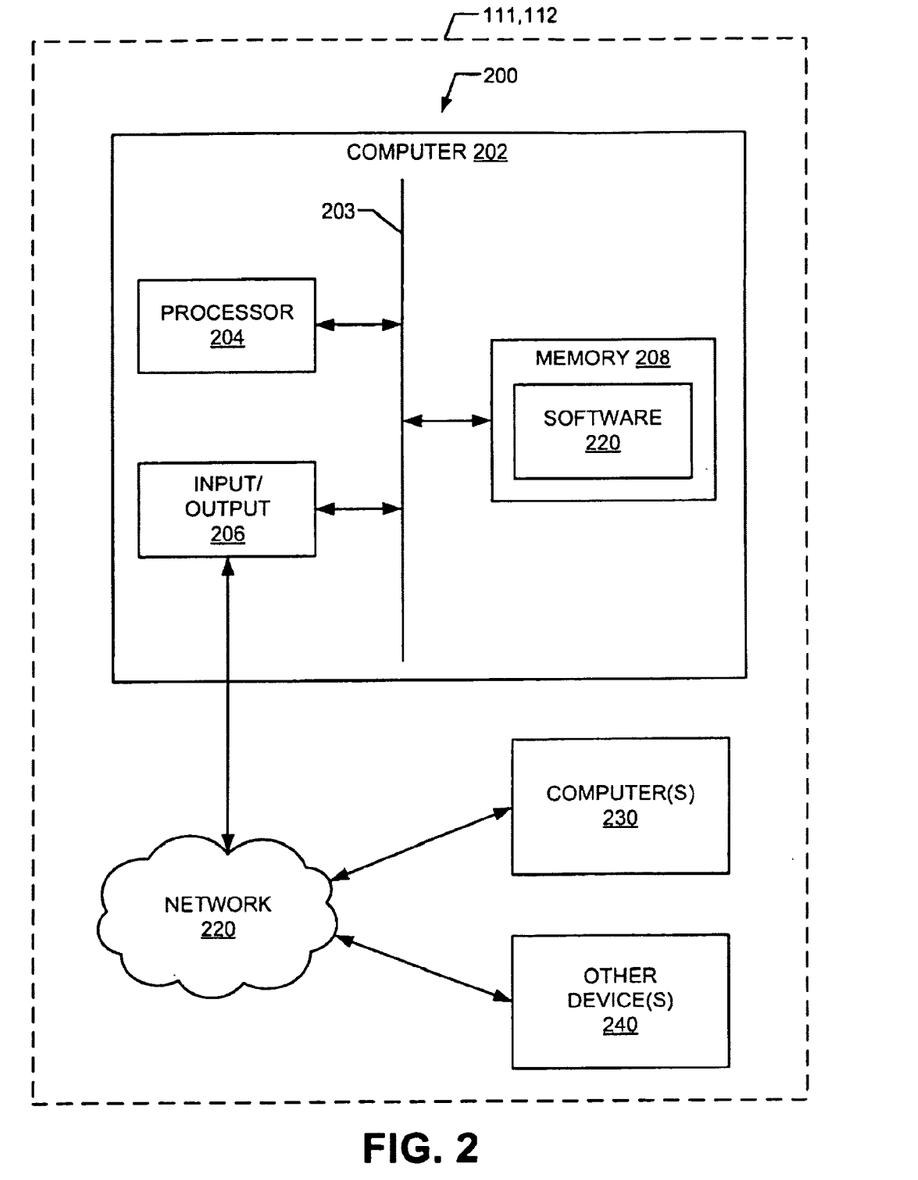
FIG. 2 is a block diagram illustrating an example of a computer system, e.g., operating within one of the exemplary phone service providers of FIG. 1, including an exemplary computing device configured to provide phone number encapsulation using a token based framework.

FIG. 2 illustrates an example of a computer system 200, e.g., operating within one of the exemplary phone service providers 111, 112 of FIG. 1, including an exemplary computing device ("computer") 202 configured to provide phone number encapsulation using a token based framework in accordance with exemplary embodiments of the invention. In addition to computer 202, exemplary computer system 200 includes network 220, computing device(s) ("computer(s)") 230, and other device(s) 240. Network 220 connects computer 202, computer(s) 230, and other device(s) 240 and may include one or more wide area networks (WANs) and/or local area networks (LANs) such as the Internet, intranet(s), and/or wireless communications network(s). Computer(s) 230 may include one or more other computers, e.g., that are similar to computer 202 and which, e.g., may operate as a server device, client device, etc. within computer system 200. Other device(s) 240 may include one or more other computing devices that provide data storage and/or other computing functions. Computer 202, computer(s) 230, and other device(s) 240 are in communication via network 220, e.g., to communicate data between them.

Exemplary computer 202 includes processor 204, input/output component(s) 206, and memory 208, which are in communication via bus 203. Processor 204 may include multiple (e.g., two or more) processors, which may, e.g., implement pipeline processing, and may also include cache memory ("cache") and controls (not depicted). The cache may include multiple cache levels (e.g., L1, L2, etc.) that are on or off-chip from processor 204 (e.g., an L1 cache may be on-chip, an L2 cache may be off-chip, etc.). Input/output component(s) 206 may include one or more components that facilitate local and/or remote input/output operations to/from computer 202, such as a display, keyboard, modem, network adapter, ports, etc. (not depicted). Memory 208 includes software 220 configured to provide phone number encapsulation using a token based framework, which is executable, e.g., by computer 202 via processor 204. Memory 208 may include other software, data, etc. (not depicted).

Figure 3:
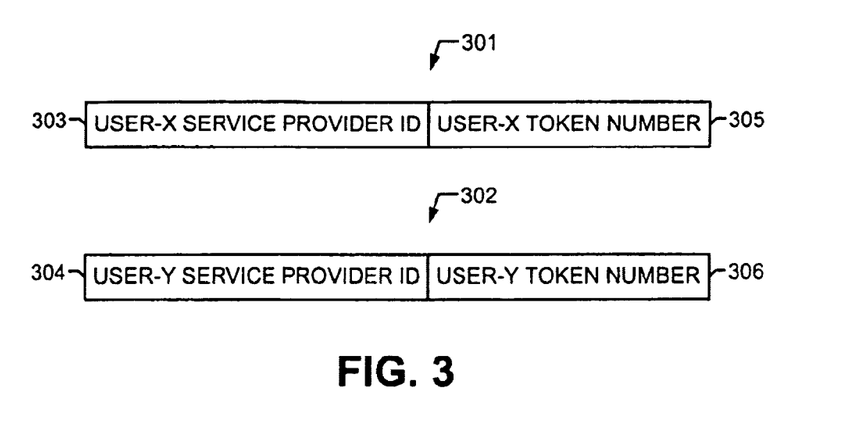
FIG. 3 is a block diagram illustrating exemplary privacy tokens used in the exemplary cell phone communications system of FIG. 1 to provide phone number encapsulation using a token based framework.

FIG. 3 illustrates an example of privacy tokens 301, 302 used in the exemplary cell phone communications system 100 of FIG. 1 to provide phone number encapsulation using a token based framework in accordance with exemplary embodiments of the invention. Privacy tokens 301, 302 may be a configuration of data, such as a data string, sequence, fields, etc., or other configuration to communicate their data content within communication system 100. Privacy tokens 301, 302 may each include a unique cell phone service provider identification (e.g., a numeric, letter, and/or alpha-numeric code) 303, 304 and a respective unique token number (letter, alpha-numeric code, etc.) 305, 306. For example, as discussed further below, user-x may be issued a first plurality of a privacy tokens 301 to cell phone 101 from cell phone service provider 111, and user-y may be issued a second plurality of privacy tokens 302 to cell phone 102 from cell phone service provider 112.

Each of the plurality of privacy tokens 301 from cell phone service provider 111 will include the unique service provider identification ("ID") for cell phone service provider 111 (e.g., "abc123a1a2a3") and a respective unique token number (e.g., 1, 2, 3, . . . ) for each privacy token 301. Similarly, each of the plurality of privacy tokens 302 from cell phone service provider 112 will include the unique service provider identification ("ID") for cell phone service provider 112 (e.g., "def456d4e5f6") and a respective unique token number (e.g., 1, 2, 3, . . . ) for each privacy token 302.

Figure 4:
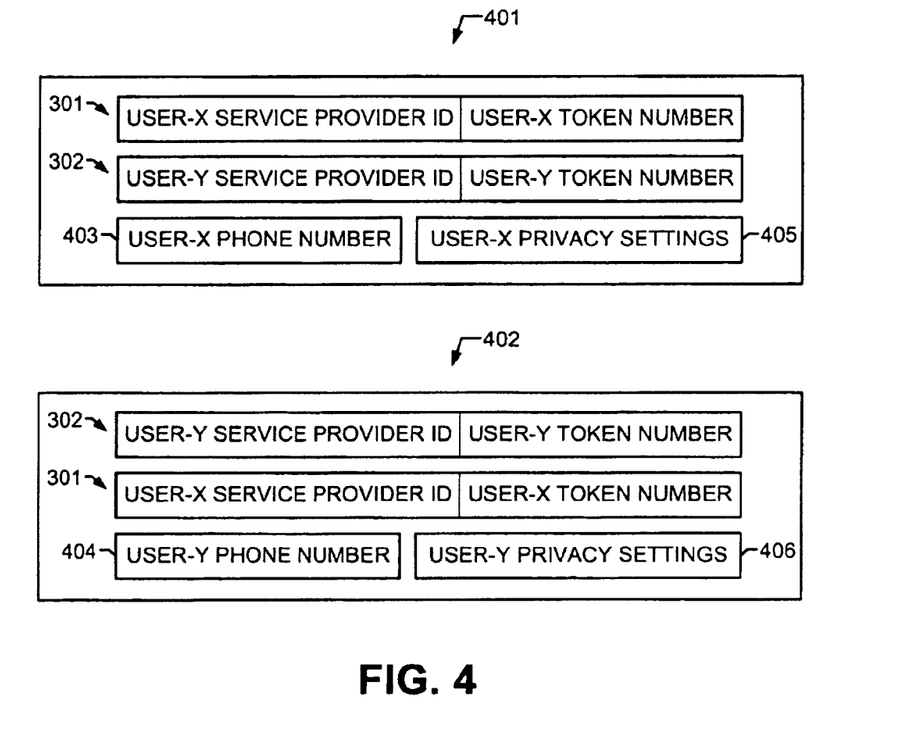
FIG. 4 is a block diagram illustrating exemplary generic tokens that include the exemplary privacy tokens of FIG. 3 and are used in the exemplary cell phone communications system of FIG. 1 to provide phone number encapsulation using a token based framework.

FIG. 4 illustrates an example of generic tokens 401, 402 that include the exemplary privacy tokens 301, 302 of FIG. 3 and are used in the exemplary cell phone communications system 100 of FIG. 1 to provide phone number encapsulation using a token based framework in accordance with exemplary embodiments of the invention. Generic tokens 401, 402 may also be a configuration of data, such as a data string, sequence, fields, etc., or other configuration to communicate their data content within communication system 100. In addition to each including privacy tokens 301, 302, generic tokens 401, 402 may include a phone number 403, 404 of a respective cell phone 101, 102 and respective privacy settings 405, 406 (e.g., of user-x or user-y) for each generic token 401, 402.

The position (or other format, configuration, etc.) of privacy tokens 301, 302 in generic tokens 401, 402 may be dependent on the designation of the caller and destination, respectively. For example, as discussed further below, a plurality of generic tokens 401 may be created for user-x by cell phone service provider 111 that each include one of the plurality of privacy tokens 301 issued to user-x in the caller position. The destination location of the generic tokens 401 may initially be blank and later, the destination of one of the generic tokens 401 may be filled with one of the privacy tokens 302 issued to user-y, as also further discussed above. Similarly, a plurality of generic tokens 402 may be created for user-y by cell phone service provider 112 that each include one of the plurality of privacy tokens 302 issued to user-x in the caller position. The destination location of the generic tokens 402 may also initially be blank and later, the destination of one of the generic tokens 402 may be filled with one of the privacy tokens 301 issued to user-x.

Figure 5:
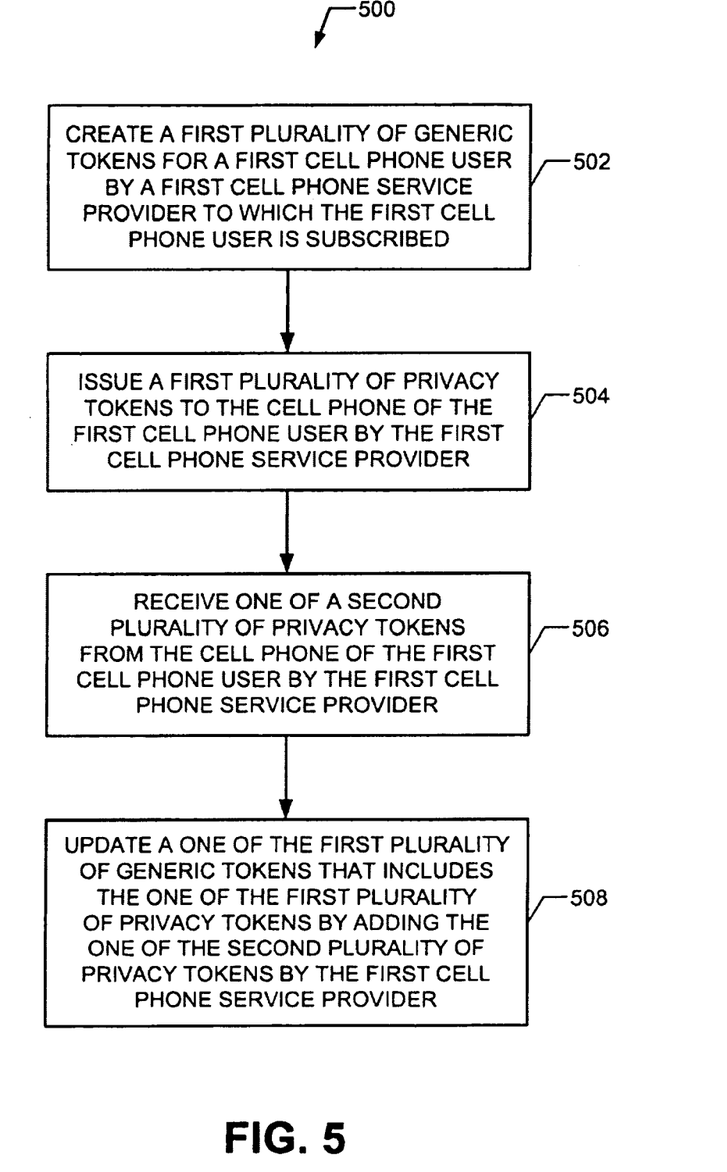
FIG. 5 is a flow diagram illustrating an example of a method to provide phone number encapsulation using a token based framework, which is executable, for example, on the exemplary computing device of FIG. 2.

FIG. 5 illustrates an example of a method 500 to provide phone number encapsulation using a token based framework, which is executable, for example, on the exemplary computer 102 of FIG. 1 (e.g., as a computer program product). Exemplary method 500 may also describe an exemplary operation of cell phone communications system 100 using privacy tokens 301, 302 and generic tokens 401, 402. In block 502, a first plurality of generic tokens (e.g., 401) is created for a first cell phone user by a first cell phone service provider (e.g., 111) to which the first cell phone user is subscribed. The first plurality of generic tokens resides with the first cell phone service provider and each include a respective unique privacy token (e.g., 301) for the first cell phone user. The respective unique privacy token includes a unique code (e.g., 303) identifying the first cell phone service provider and a respective unique token number (e.g., 304). The first plurality of generic tokens also each include a phone number (e.g., 403) for a cell phone (e.g., 101) of the first cell phone user and a respective privacy setting (e.g., 405).

In block 504, a first plurality of privacy tokens is issued to the cell phone of the first cell phone user by the first cell phone service provider. This first plurality of privacy tokens includes the respective unique privacy token for each of the first plurality of generic tokens described with respect block 502. In block 506, one of a second plurality of privacy tokens (e.g., 302) from the cell phone of the first cell phone user is received by the first cell phone service provider. The one of the second plurality of privacy tokens is associated with one of the first plurality of privacy tokens by the first cell phone user. The one of the second plurality of privacy tokens is received by the first cell phone user from a second cell phone user through an exchange (e.g., 130) between the cell phone of the first cell phone user and a cell phone (e.g., 102) of the second cell phone user.

The second plurality of privacy tokens is received by the cell phone of the second cell phone user from a second cell phone service provider (e.g., 112) to which the second cell phone user is subscribed and includes a respective unique privacy token (e.g., 302) for the second cell phone user corresponding to each of a second plurality of generic tokens (e.g., 402) for the second cell phone user created by the second cell phone service provider. Each respective unique privacy token includes a unique code (e.g., 304) identifying the second cell phone service provider and a respective unique token number (e.g., 306). The second plurality of generic tokens resides with the second cell phone service provider and each include the respective unique privacy token, a phone number (e.g., 404) for the cell phone of the second cell phone user, and a respective privacy setting (e.g., 406). The one of the first plurality of privacy tokens is received by the second cell phone user from the first cell phone user through the exchange between the cell phone of the first cell phone user and the cell phone of the second cell phone user. The one of the first plurality of privacy tokens is associated with the one of the second plurality of privacy tokens by the second cell phone user, and the one of the first plurality of privacy tokens is received from the cell phone of the second cell phone user by the second cell phone service provider. In some embodiments, the exchange between the cell phone of the first cell phone user and the cell phone of the second cell phone user includes one of infrared (IR) signal communication or low power radio frequency (RF) signal communication between the cell phone of the first cell phone user and the cell phone of the second cell phone user.

In block 508, a one of the first plurality of generic tokens that includes the one of the first plurality of privacy tokens is updated by adding the one of the second plurality of privacy tokens by the first cell phone service provider. A one of the second plurality of generic tokens that includes the one of the second plurality of privacy tokens is similarly updated by adding the one of the first plurality of privacy tokens by the second cell phone service provider. The one of the first plurality of generic tokens and the one of the second plurality of generic tokens facilitate the first cell phone user to call the cell phone of the second cell phone user via the cell phone of the first cell phone user. They also facilitate the second cell phone user to call the cell phone of the first cell phone user via the cell phone of the second cell phone user. This calling is facilitated without a disclosure of the phone number for the cell phone of the second cell phone user to the first cell phone user or another party (e.g., a third party service provider) or a disclosure of the phone number for the cell phone of the first cell phone user to the second cell phone user or another party.

In some embodiments, a preference for the privacy setting of the one of the first plurality of generic tokens that includes the one of the first plurality of privacy tokens is received from the first cell phone user by the first cell phone service provider. Similarly, a preference for the privacy setting of the one of the second plurality of generic tokens that includes the one of the second plurality of privacy tokens is received from the second cell phone user by the second cell phone service provider. In some embodiments, the preference for the privacy setting of the one of the first plurality of generic tokens includes a time period during which the first cell phone user prefers to receive calls from the second cell phone user, and the preference for the privacy setting of the one of the second plurality of generic tokens includes a time period during which the second cell phone user prefers to receive calls from the first cell phone user.

In some embodiments, the method 500 to provide phone number encapsulation using a token based framework further includes the following actions. A call to the cell phone of the second cell phone user is received from the cell phone of the first cell phone user by the first cell phone service provider, where the call includes the one of the first plurality of privacy tokens associated with the one of the second plurality of privacy tokens. The one of the first plurality of generic tokens is fetched that corresponds to the one of the first plurality of privacy tokens and the phone number for the cell phone of the first cell phone user by the first cell phone service provider. The second cell phone service provider is called by the first cell phone service provider using the unique code identifying the second cell phone service provider included in the one of the second plurality of privacy tokens that is included in the one of the first plurality of generic tokens. This call includes transmitting the one of the first plurality of privacy tokens and the one of the second plurality of privacy tokens to the second cell phone service provider.

The second cell phone service provider responds to the calling by the first cell phone service provider with the following actions. The one of the first plurality of privacy tokens and the one of the second plurality of privacy tokens is searched for among the second plurality of generic tokens. If found, the one of the second plurality of generic tokens is fetched that includes the one of the first plurality of privacy tokens and the one of the second plurality of privacy tokens. The cell phone of the second cell phone user is called using the phone number of the cell phone of the second cell phone user included in the one of the second plurality of generic tokens to complete the call from the cell phone of the first cell phone user to the cell phone of the second cell phone user. In some embodiments, calling the cell phone of the second cell phone user by the second cell phone service provider includes calling the cell phone of the second cell phone user if permitted according to the privacy settings included in the one of the second plurality of generic tokens.

In other embodiments, the method 500 to provide phone number encapsulation using a token based framework further includes the following actions. A call from the second cell phone service provider is received by the first cell phone service provider, where the second cell phone service provider does the following. A call to the cell phone of the first cell phone user is received from the cell phone of the second cell phone user, where the call includes the one of the second plurality of privacy tokens associated with the one of the first plurality of privacy tokens. The one of the second plurality of generic tokens is fetched that corresponds to the one of the second plurality of privacy tokens and the phone number for the cell phone of the second cell phone user. The first cell phone service provider is called using the unique code identifying the first cell phone service provider included in the one of the first plurality of privacy tokens that is included in the one of the second plurality of generic tokens, where the call includes transmitting the one of the second plurality of privacy tokens and the one of the first plurality of privacy tokens to the first cell phone service provider.

Continuing the description of the actions of other embodiments, the one of the second plurality of privacy tokens and the one of the first plurality of privacy tokens is searched for among the first plurality of generic tokens by the first cell phone service provider. If found, the one of the first plurality of generic tokens is fetched that includes the one of the second plurality of privacy tokens and the one of the first plurality of privacy tokens by the first cell phone service provider. The cell phone of the first cell phone user is called by the first cell phone service provider using the phone number of the cell phone of the first cell phone user included in the one of the first plurality of generic tokens to complete the call from the cell phone of the second cell phone user to the cell phone of the first cell phone user. In some embodiments, calling the cell phone of the first cell phone user by the first cell phone service provider includes calling the cell phone of the first cell phone user if permitted according to the privacy settings included in the one of the first plurality of generic tokens.

In yet other embodiments, the method 500 to provide phone number encapsulation using a token based framework further includes deactivating (invalidating, revoking, etc.) the one of the first plurality of privacy tokens included in the one of the first plurality of generic tokens by the first cell phone service provider in response to a request to deactivate the one of the first plurality of privacy tokens from the first cell phone user. This deactivating of the one of the first plurality of privacy tokens by the first cell phone service provider prevents the cell phone of the second cell phone user from completing a call to the cell phone of the first cell phone user using the one of the first plurality of privacy tokens that is included in the one of the second plurality of generic tokens. Similarly, a deactivating of the one of the second plurality of privacy tokens by the second cell phone service provider in response to a request from the second cell phone user prevents the cell phone of the first cell phone user from completing a call to the cell phone of the second cell phone user using the one of the second plurality of privacy tokens that is included in the one of the first plurality of generic tokens.

In further yet other embodiments, the method 500 to provide phone number encapsulation using a token based framework further includes updating the phone number of the first cell phone user included in the one of the first plurality of privacy tokens by the first cell phone service provider in response to a request from the first cell phone user to update the phone number of the first cell phone user with a different phone number. Similarly, the second cell phone service provider updates the phone number of the second cell phone user included in the one of the second plurality of privacy tokens in response to a request from the second cell phone user to update the phone number of the second cell phone user with a different phone number.

Exemplary communications system 100, computer system 200, privacy tokens 301, 302, and generic tokens 401, 402 are illustrated and described with respect to various components, modules, etc. for exemplary purposes. It should be understood that other variations, combinations, or integrations of such elements that provide the same features, functions, etc. are included within the scope of embodiments of the invention.

The flowchart and/or block diagram(s) in the Figure(s) described herein illustrate the architecture, functionality, and/or operation of possible implementations of systems, methods, and/or computer program products according to various embodiments of the present invention. In this regard, each block in a flowchart or block diagram may represent a module, segment, or portion of code, which comprises one or more executable instructions for implementing the specified logical function(s). It should also be noted that, in some alternative implementations, the functions noted in a flowchart or block diagram may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in a flowchart or block diagram can be implemented by special purpose hardware-based systems that perform the specified functions or acts, or combinations of special purpose hardware and computer instructions.

The terminology used herein is for the purpose of describing exemplary embodiments and is not intended to be limiting of the present invention. As used herein, the singular forms "a", "an", and "the" are intended to include the plural forms as well, unless the context clearly indicates otherwise. It will be further understood that the terms "comprises", "comprising", "includes", or "including" when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of any means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The exemplary embodiment(s) were chosen and described in order to explain the principles of the present invention and the practical application, and to enable others of ordinary skill in the art to understand the present invention for various embodiments with various modifications as are suited to the particular use contemplated.

As will be appreciated by one skilled in the art, the present invention may be embodied as a system, method, and/or computer program product. Accordingly, the present invention may take the form of an entirely hardware embodiment, an entirely software embodiment (including firmware, resident software, micro-code, etc.), and/or or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example, but not limited to, an electronic, magnetic, optical, electromagnetic, infrared, or semiconductor system, apparatus, device, or propagation medium. More specific examples (a non-exhaustive list) of the computer-readable medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++, or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described herein with reference to flowchart illustrations and/or block diagrams of methods, apparatus (systems), and/or computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block(s).

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block(s). The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide processes for implementing the functions/acts specified in the flowchart and/or block diagram blocks.

While exemplary embodiments of the invention have been described, it will be understood that those skilled in the art, both now and in the future, may make various improvements and enhancements which fall within the scope of the claims that follow. These claims should be construed to maintain the proper protection for the invention first described.

What is claimed is:

1. A method to manage at least one phone number, the method comprising generating a set of tokens by a service provider for a phone number provided by the service provider, wherein the set of tokens comprise a generic token and a privacy token associated with a first user, the generic token is maintained by the service provider and includes the privacy token associated with the first user, and the privacy token is distributed to the first user and includes an identification of the service provider.

2. The method as claimed in claim 1, further comprising:
   sending, by the first user, the privacy token to a second user; and
   receiving, by the first user, a second privacy token associated with the second user.

3. The method as claimed in claim 2, wherein the second privacy token is received from the second user and identifies a service provider of the second user.

4. The method as claimed in claim 3, wherein the generic token associated with first user is updated at the service provider to include the second privacy token associated with the second user.

5. The method of claim 2, wherein the generic token comprises the phone number, which is assigned to the first user.

6. The method of claim 5, wherein the generic token comprises the second privacy token associated with the second user.

7. The method of claim 6, wherein the generic token comprises privacy settings associated with the first user.

8. The method of claim 1, wherein the set of tokens comprises a plurality of privacy tokens for the first user, with each of the plurality of privacy tokens of the first user comprising a unique identifier for the service provider and a unique identifier for the each privacy token.

9. A method to route a call between a first user and a second user without the first user and second user disclosing their respective phone numbers to one another, the method comprising:
   maintaining a privacy token of the first user on a mobile device of the first user;
   routing a call to a service provider of the first user, the call including the privacy token of the first user;
   determining a privacy token of the second user, wherein information regarding the second user is stored in a generic token of the first user at the service provider;
   determining a service provider of the second user using the privacy token of the second user;
   routing the call to the service provider of the second user;
   transmitting the privacy tokens of the first user and the second user to the service provider of the second user; and
   completing the call to the second user through the service provider of the second user.

10. The method as claimed in claim 9, wherein the generic token of the first user maintained at the service provider is configured to contain at least one of the privacy tokens of the second user.

11. The method as claimed in claim 9, wherein the privacy token of each user has information of the service provider associated with the user.

12. The method as claimed in claim 9, wherein the generic token associated with the first user is configured to store the phone number of the first user.

13. The method as claimed in claim 9, wherein a generic token associated with the second user and maintained at the service provider of the second user is configured to store privacy settings of the second user.

14. The method as claimed in claim 13, wherein the privacy settings of the second user comprises a time of the day during which the second user can be called, and the first user is allowed to establish a call with the second user only when the first user calls during the time allowed through the privacy settings of the second user.

15. The method as claimed in claim 9, wherein the first user blocks the second user from calling the first user by deactivating the privacy token that the first user shared with the second user.

16. The method as claimed in claim 15, wherein deactivating the privacy token comprises at least one of deleting the privacy token or dropping the generic token holding the association between privacy tokens of the first user and the second user.

17. The method as claimed in claim 9, wherein responsive to the first user's telephone number being changed, all relevant generic tokens of the first user are updated with a new telephone number of the first user thereby enabling the second user to call the first user without knowing that the telephone number of the first user has changed.

18. The method as claimed in claim 9, wherein on routing the call to the second user's service provider, generic tokens associated with the second user and stored with the service provider of the second user are scanned.

19. The method as claimed in claim 18, wherein on scanning, a generic token containing an association between the privacy tokens of the first and the second user is identified, wherein the phone number of the second user is specified by the generic token, and the service provider of the second user places the call to the second user using the phone number specified by the generic token.

20. A method for generating a token structure by a data processing apparatus of a service provider, comprising steps of:
   generating, by the data processing apparatus, at least one privacy token for a subscriber of the service provider, the privacy token comprising a unique identifier for the service provider and a unique identifier for the privacy token; and
   generating, by the data processing apparatus, at least one generic token for the subscriber, the generic token comprising information specified in the at least one privacy token, information specified in a second privacy token associated with a second subscriber subscribed with a second service provider, and a phone number associated with the subscriber.

* * * * *